United States Patent
Bark et al.

(10) Patent No.: US 6,628,956 B2
(45) Date of Patent: *Sep. 30, 2003

(54) ADAPTIVE POWER CONTROL IN A RADIO COMMUNICATIONS SYSTEMS

(75) Inventors: Gunnar Bark, Linköping (SE); Thomas Rimhagen, Linköping (SE); Walter Müller, Upplands Väsby (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,686

(22) Filed: Mar. 15, 1999

(65) Prior Publication Data

US 2002/0077138 A1 Jun. 20, 2002

(51) Int. Cl.$^7$ ............... H04B 7/00; H04Q 7/20
(52) U.S. Cl. ............ 455/522; 455/69; 455/63.1
(58) Field of Search ............ 455/522, 69, 63, 455/67.6, 453, 63.1, 67.16

(56) References Cited

U.S. PATENT DOCUMENTS

| | | | |
|---|---|---|---|
| 4,868,795 A | * | 9/1989 | McDavid ............... 367/77 |
| 4,870,698 A | * | 9/1989 | Katsuyama ............ 455/67.1 |
| 5,107,487 A | | 4/1992 | Vilmur et al. |
| 5,267,262 A | | 11/1993 | Wheatley, III |
| 5,430,760 A | | 7/1995 | Dent |
| 5,485,486 A | * | 1/1996 | Gilhousen et al. ...... 455/522 |

(List continued on next page.)

OTHER PUBLICATIONS

Kazuo Mori, "Adaptive Transmission Power Control in CDMA Slotted–Aloha Radio Communications", IEEE 1998 Internationa Conference on Universal Personal Communications. Oct. 1998. vol. 2, pp. 1137–1141.*
U.S. patent application Ser. No. 08/733,501.
U.S. patent application Ser. No. 08/847,655.
U.S. patent application Ser. No. 09/096,930.

*Primary Examiner*—Dwayne Bost
*Assistant Examiner*—James K Moore
(74) *Attorney, Agent, or Firm*—Nixon & Vanderhye, P.C.

(57) ABSTRACT

Delays on a common radio communications channel employed by plural mobile stations to communicate with a base station located in a corresponding geographical cell area are minimized by adapting transmission power based on traffic conditions. For lower traffic loads, a higher transmission power is permitted. For higher traffic loads, a lower power level is set. A transmit power level is determined using a desired signal ratio, such as a target CIR, a transmission path loss over the radio communications channel, and an interference value. One or more adaptive power parameters are also employed in that determination to adapt the open loop power control based on one or more current communications conditions and/or characteristics of the mobile station. For example, an adaptive power parameter may be a function of a current interference in a base station cell either alone or in combination with a current interference in one or more neighboring cells. The adaptive power parameter may also account for a type of data packet connection to be employed between the mobile station and the base station after random access, a mobile station's subscription, a current temperature of the mobile station, a current base station used by the mobile station, a current estimated path loss between the mobile station and base station, and/or other factors.

40 Claims, 4 Drawing Sheets

U.S. PATENT DOCUMENTS

| | | |
|---|---|---|
| 5,491,837 A | 2/1996 | Haartsen |
| 5,517,189 A * | 5/1996 | Bachhuber ............. 340/825.69 |
| 5,551,057 A | 8/1996 | Mitra |
| 5,574,982 A | 11/1996 | Almgren et al. |
| 5,604,730 A | 2/1997 | Tiedemann, Jr. |
| 5,799,005 A | 8/1998 | Soliman |
| 5,805,585 A * | 9/1998 | Javitt ......................... 370/342 |
| 5,839,056 A * | 11/1998 | Hakkinen ................... 455/69 |
| 5,859,838 A | 1/1999 | Soliman |
| 5,930,684 A * | 7/1999 | Keskitalo ..................... 455/69 |
| 6,091,966 A * | 7/2000 | Meadows ................... 455/553 |
| 6,128,506 A * | 10/2000 | Knutsson et al. ........... 455/522 |
| 6,160,996 A * | 12/2000 | Blodgett ...................... 455/63 |
| 6,169,906 B1 * | 1/2001 | Bruckert ..................... 455/518 |
| 6,181,919 B1 * | 1/2001 | Ozluturk ..................... 455/69 |
| 6,195,562 B1 * | 2/2001 | Pirhonen .................... 455/553 |
| 6,321,066 B1 * | 11/2001 | Katz et al. .................. 455/522 |

* cited by examiner

Example of probability density function (pdf) of the received CIR γ.

ADAPTIVE POWER CONTROL IN A RADIO COMMUNICATIONS SYSTEMS

FIELD OF THE INVENTION

The present invention relates to power control in radio communications, and more particularly, to more efficient and effective open loop power control. The adaptive open loop power control approach of the present invention is particularly well-suited for communications in a Code Division Multiple Access (CDMA) cellular radio system.

BACKGROUND AND SUMMARY OF THE INVENTION

Power control is very important in radio communications systems, and particularly so in third generation Wideband Code Division Multiple Access (WCDMA) cellular systems. Before transmitting over an "uplink" channel, a mobile station must set its transmission power level. Similarly, the radio access network must set base station transmit power on "downlink channels," e.g., a paging channel (PCH), a forward access channel (FACH), in addition to traffic channels (TCH. Indeed, the actual power level set for mobile and base station radio transmission and the interference levels that result therefrom are significant concerns in all mobile radio communications systems.

The physical characteristics of a radio channel may vary significantly due to a number of reasons. For example, the signal propagation loss between a radio transmitter and receiver varies as a function of their respective locations, obstacles, weather, etc. As a result, large differences may arise in the strength of signals received at the base station from different mobiles. If the transmission power of a mobile station signal is too low, the receiving base station may not correctly decode a weak signal, and the signal will have to be corrected (if possible) or retransmitted. Accordingly, erroneous receipt of the signals adds to the delay associated with radio access procedures, increases data processing overhead, and reduces the available radio bandwidth because signals must be retransmitted. On the other hand, if the mobile transmission power is too high, the signals transmitted by the mobile station create interference for the other mobile and base stations in the system.

Interference is a particularly severe problem in CDMA systems where a large number of radios transmit and receive on the same frequency. If one mobile station transmits at a power output that is too large, the interference it creates degrades the signal-to-interference ratio (SIR) of signals received from other mobile radios to the point that a receiving base station cannot correctly demodulate transmissions from the other mobile radios. In fact, if a mobile station transmits a signal at twice the power level needed for the signal to be accurately received at the base station receiver, that mobile signal occupies roughly twice the system capacity as it would if the signal were transmit at the optimum power level. Unregulated, it is not uncommon for a strong mobile station to transmit signals that are received at the base station at many, many times the strength of other mobile transmissions. The loss of system capacity to such excessively "strong" mobile stations is unacceptable.

Additional problems are associated with transmitting with too much power. One is the so-called "party effect." If a mobile transmits at too high of a power level, the other mobiles may increase their respective power levels so that they can "be heard" compounding the already serious interference problem. Another problem is wasted battery power.

It is very important to conserve the limited battery life in mobile radios. By far, the largest drain on a mobile's battery occurs during transmission. A significant objective for any power control approach, therefore, is to reduce transmit power where possible without increasing the number of retransmissions to an unacceptably high level as a consequence of that power reduction. Except for battery consumption, the above-described problems with setting transmission power also apply to downlink radio transmissions from base stations.

There are two basic approaches to power control: open loop and closed loop. In open loop power control, the transmit power is calculated at the transmitter based on one or more parameters, and the calculated value is used to set the transmit power level. In particular, the transmit power is adjusted in order to match an estimated path loss so that the signal is received at the base station at a predetermined power level. Closed loop power control relies on feedback from the receiver so that the transmitter knows, for example, at what power level (and sometimes also at what interference level) the transmitted signal was received. Using this feedback, the transmitter then appropriately adjusts its transmit power level. Alternatively, the receiver may simply order the transmitter to increase or decrease its transmit power. The additionally received feedback information means that closed loop power control is generally more accurate than open loop power control.

Common channels for both uplink and downlink shared by several mobile radios are typically used to transmit relatively short control signaling messages which do not justify the additional "cost" in terms of delay, signaling overhead, spreading code allocation, and bandwidth consumption associated with dedicated channels. Common channels may also be utilized to transmit short traffic data packets appended directly to the typical control messages sent on common channels. "Lower cost" open loop power control is well-suited for transmission over common channels being faster, less complicated, and occupying fewer radio resources than closed loop power control commonly used for dedicated channels.

One type of common channel shared by mobile stations is a random access channel which provides communication between plural mobile stations and a base station when those mobile stations have not been allocated a dedicated channel. Access channel messages may include for example call reservations, responses to pages, orders, registrations, and small size user data packets. However, because multiple mobile stations may be using the random access channel at the same time, each additional mobile station transmitting on that access channel contributes to the background noise and interference thereby diminishing the system's finite capacity. Consequently, it is important to set the appropriate output power of the mobile station before transmitting.

Thus, before performing a random access, the mobile station caculates an open loop transmission power $P_{tx}$ to be used on the random access channel in the uplink direction so that the mobile's signal is received at the base station at a predetermined power level. In particular, the mobile station strives to achieve a target Carrier-to-Interference Ratio (CIR) $\gamma_t$ at the base station. The carrier-to-interference ratio actually received at the base station corresponds to the received uplink carrier power $C_{UL}$ minus the uplink interference $I_{UL}$. The received carrier power $C_{UL}$ corresponds to the mobile's transmit power level $P_{tx}$ minus the path loss L. The open loop power control therefore can determine the transmit power $\hat{P}_{tx}$ as a function of the target carrier-to-interference ratio $\gamma_t$, an uplink interference estimate $\hat{I}_{UL}$, and a path loss estimate L. The path loss estimate $\hat{L}$ may be obtained with the mobile station measuring the received power of a known signal (e.g., a downlink pilot or other broadcasted signals) transmitted on a downlink channel by the base station. The known signal includes a message that informs the mobile of the power at which that known signal is being transmit by the base station. The uplink interference is estimated (measured) and broadcast by the base station over the cell together with a downlink pilot signal output power value. The transmit power $\hat{P}_{tx}$ may then be determined using the target CIR $\gamma_t$, the uplink interference estimate $\hat{I}_{UL}$, and the path loss estimate $\hat{L}$ in accordance with the following open loop power control algorithm:

$$\hat{P}_{tx} = \gamma_t + \hat{I}_{UL} + \hat{L} \quad (1)$$

Unfortunately, the open loop power control algorithm in equation (1) suffers from uncertainties that make the received carrier-to-interference ratio different (often significantly different) from the target carrier-to-interference ratio $\gamma_t$. For example, the estimated path loss $\hat{L}$ typically differs from the actual path loss L because of a number of factors such as: (1) the actual power at which the base station transmits the pilot signal likely differs from the broadcasted downlink pilot signal output power value, (2) inaccurate measurements of signal strength in the mobile station, and (3) fading, noise, and delays in measuring the path loss. Similarly, the uplink interference $I_{UL}$ can change significantly since it was last measured by the base station. And even if the transmit power $\hat{P}_{tx}$ determined by the open loop power control procedure is a reasonably accurate estimate, the actual transmit power $P_{tx}$ at which the mobile station transmits likely differs from the commanded transmission power due to imperfections and hardware limitations in the mobile station implementation. For example, the mobile transmit power varies significantly depending on the current temperature of the mobile station and on the non-linearity of components employed in the mobile station. The actual received carrier-to-interference ratio $\gamma$ at the base station will be $$\gamma = P_{tx} - I_{UL} - L \quad (2)$$

The actual transmit power $P_{tx}$, the actual uplink interference, and the actual path loss cannot be known with certainty. The shortcomings of open loop power control described for uplink transmission also apply to open loop power control for downlink transmission on common channels, e.g. the forward access channel (FACH), etc.

These various factors may cause the received carrier-to-interference ratio $\gamma$ to differ from the target carrier-to-interference ratio $\gamma_t$ by as much as ±10 dB or more. FIG. 1 illustrates this uncertainty through a sketch of the probability density function (PDF) $fT(\gamma)$ of the received CIR. In reality, the probability density function of the received CIR, probably would likely be closer to a Gaussian distribution. FIG. 1 simply illustrates the fact that there is a spread of the received CIR.

In summary, the limitations of the above-described open loop power control approach and the practicalities of operation (e.g., temperature) and implementation (e.g., non-linear components) make it difficult to achieve an appropriate open loop transmit power for the current transmission under the current circumstances. The end result is either a failed communication (too low of a transmit power) or unnecessary interference with resulting system capacity loss (too high of a transmit power).

One way to address some of the above-described problems is to employ power "ramping" such as described in Ericsson's U.S. Pat. No. 5,430,760 to Dent. The mobile station initiates a random access at a low initial transmit power level and gradually (e.g., incrementally) increases the transmission power level until the base station detects and acknowledges the access signal. Once detected, power level of the message is maintained at the detected level. One drawback with this power ramp-up approach is that it could introduce significant delay into the access procedure. Specifically, there may be substantial delay between access attempts while the mobile waits for an acknowledgement of the most recently transmitted access signal. This delay is particularly undesirable at low traffic load levels when interference caused by a random access transmission is of less importance. On the other hand, if the ramp-up occurs too quickly, it would likely reach too high of a power level by the time the detected signal is acknowledged. Another drawback is the need for an acknowledgment from the receiver. The acknowledgment message could be lost or not received with result that the ramp-up continues unnecessarily. At a minimum, the acknowledgment adds some complexity.

To decrease the delay in the power ramping procedure, power ramping on preamble level may be employed as described in commonly-assigned U.S. patent application Ser. No. 09/166,679, filed Oct. 5, 1998, and incorporated herein by reference. The mobile station transmits only short preamble signals with increasing power until the base station detects the received preamble energy (as opposed to decoding the entire random access message) and sends back a positive acquisition indicator to the mobile. However, regardless of how power ramping is effected, the initial transmit power level from which to start ramping must be decided by the transmitter based on the above described open loop power control.

It is an object of the present invention to achieve an optimal power control method that accounts for current transmission conditions.

It is an object of the present invention to provide an adaptive power control technique that ensures a satisfactory quality of communication at a minimal level of interference.

It is an object of the present invention to determine a compensated transmit power level that results in an actually received CIR that is at or close to a target CIR.

It is an object of the present invention to reduce transmit power without increasing the number of retransmissions as a consequence of that power reduction.

It is an object of the present invention to extend the battery life of mobile stations by controlling the transmit power level of the mobile station to a minimal but still effective transmit power level.

It is an object of the present invention to eliminate unnecessary delays in radio access when open loop power control is employed in an access transmission, especially during low traffic conditions.

It is an object of the present invention to eliminate unnecessary delays in radio access when preamble power ramping is employed in an access transmission especially during low traffic conditions.

It is an object of the present invention to provide a flexible mobile station power control technique that takes into account current interference level(s), mobile station specific parameters, and other factors without requiring a power detection acknowledgment signal or other power-related feedback from the receiver.

It is an object of the present invention for the mobile station to adapt an open loop power setting by recognizing a power level feedback received in the acknowledge message from the base station both at successful and unsuccessful random accesses.

It is an object of the present invention for the mobile station to adapt and compensate for the temperature, mobile station systematic errors, and base station systematic errors.

The adaptive power control of the present invention overcomes the above-identified problems and satisfies these and other objects. In a preferred, example embodiment, delay on a common radio communications channel employed by plural mobile stations to communicate with a base station located in a corresponding geographical cell area is minimized by adapting transmission power based on a traffic load. For lower traffic loads, a higher transmission power is permitted. For higher traffic loads, a lower power level is set.

Transmit power level is determined using a desired signal ratio, such as a target CIR, a transmission path loss over the radio communications channel, and an interference value. An adaptive power parameter is also introduced which adapts the transmit power control based on one or more other current communications conditions and/or characteristics of the mobile station. For example, the adaptive power parameter may be a function of a current interference in a base station cell either alone or in combination with a current interference in one or more neighboring cells. The adaptive power parameter may also account for a type of data packet connection to be employed between the mobile station and the base station after random access, a mobile station's subscription, a current temperature of the mobile station, a current base station used by the mobile station, a current estimated path loss between the mobile station and base station, and/or other factors.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, techniques, parameters, etc., in order to provide a thorough understanding of the present invention. However, it will be apparent to one skilled in the art that the present invention may be practiced in other embodiments that depart from these specific details. For example, while the present invention may be applied advantageously to mobile transmissions on an uplink, random access channel in a CDMA communications system, the present invention can also advantageously be employed to control the transmit power of a radio in any direction, over any particular channel type, and in any type of communications system, e.g., FDMA, TDMA, etc. Although the present invention is sometimes described in the context of a random access type of common channel, the invention is equally applicable to other common channels and to dedicated channels. Indeed, the present invention can be employed in any transmit power control situation. In other instances, detailed descriptions of well-known methods, interfaces, devices, and signaling techniques are omitted so as not to obscure the description of the present invention with unnecessary details.

Figure 1:
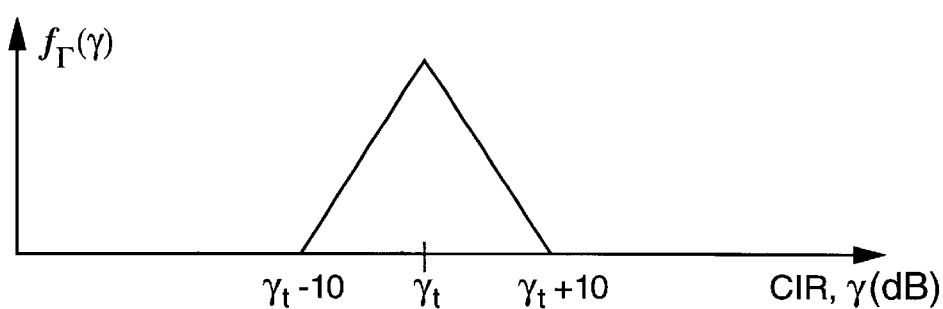
FIG. 1 is a graph plotting the probability density function for received carrier-to-interference ratio $\gamma$.
Figure 2:
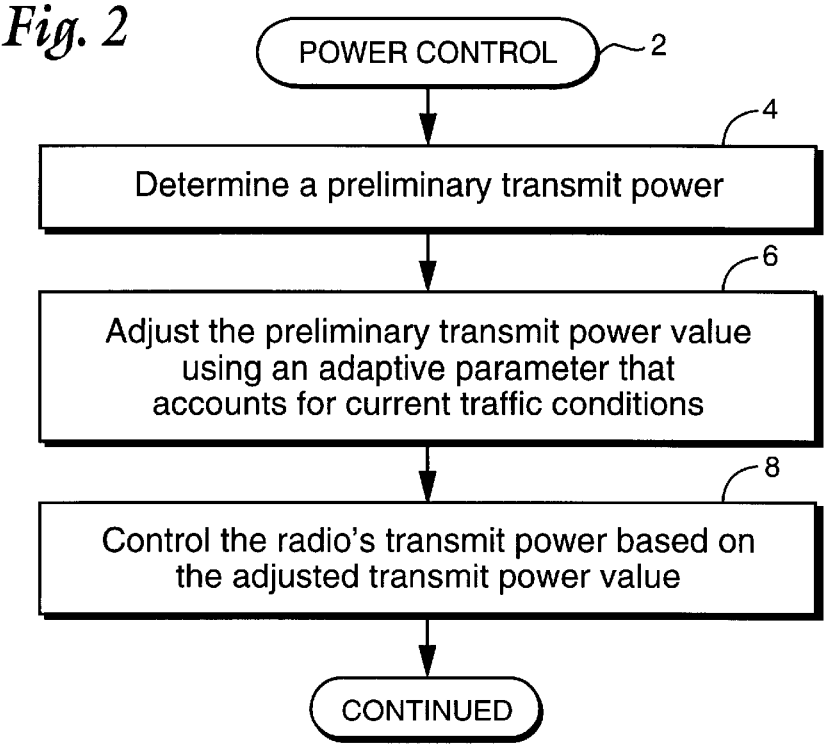
FIG. 2 is a flowchart diagram illustrating a power control procedure in accordance with an example embodiment of the present invention.

A first example embodiment is now described in conjunction with a power control routine (block 2) shown in FIG. 2. Initially, a transmitting radio determines a preliminary transmit power (block 4). However, setting the radio transmit power level based upon this determined preliminary transmit power will very likely result in the receiving radio receiving the signal at an undesired carrier-to-interference ratio, i.e., either too high or too low of a CIR. Accordingly, the preliminary transmit power in block 4 is adjusted using an adaptive parameter that accounts for one or more current traffic conditions (block 6). In this a preferred example embodiment, the adaptive parameter accounts for a current traffic load affecting this radio communication. The radio's transmit power is then controlled based upon the adjusted transmit power value (block 8). More specifically, at low traffic loads, the adaptive parameter value is set higher resulting in a higher transmit power value. Alternatively, at higher traffic loads, the adaptive power parameter value is set lower, perhaps even to a negative value to minimize the disturbance to other nearby radios. Otherwise, an excessive transmit power could, in some cases, result in an uncontrolled increase of other radio transmit powers (i.e., the party effect) until they reach their maximum transmit power.

Figure 3:
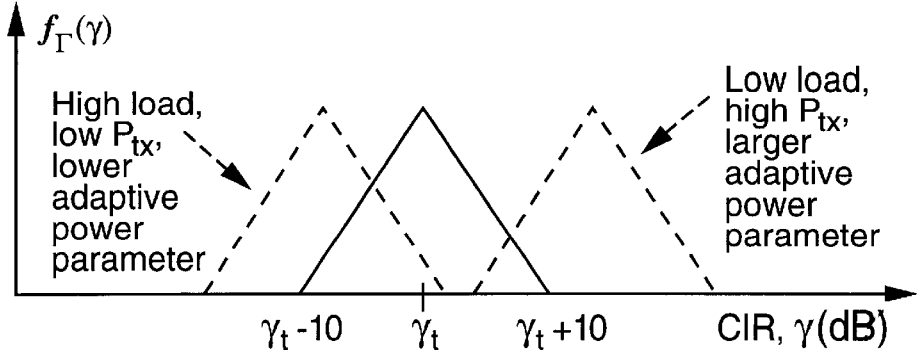
FIG. 3 is a graph illustrating the effect on the probability density function of received carrier-to-interference ratio $\gamma$ for different values of an adaptive power parameter in accordance with an example of the present invention.

FIG. 3 shows a graph of the probability density function $f_\Gamma(\gamma)$ of received carrier-to-interference ratio $\gamma$ relative to the target CIR $\gamma_t$ and the effects of different adaptive parameter values. A larger adaptive power parameter value shifts the $f_\Gamma(\gamma)$ graph to the right meaning that there is a higher probability of a received CIR larger than the target CIR. This results in a greater likelihood of a successful communication and a lower delay associated with that communication. A lower adaptive power parameter value shifts the graph to the left to decrease the amount of interference caused by each user with, however, a lower probability of a successful transmission. The present invention also provides the mobile station with an ability to vary the adaptive power parameter due to temperature, mobile station systematic errors, and base station systematic errors so that the width of the probability density function $f_\Gamma(\gamma)$ decreases.

Figure 4:
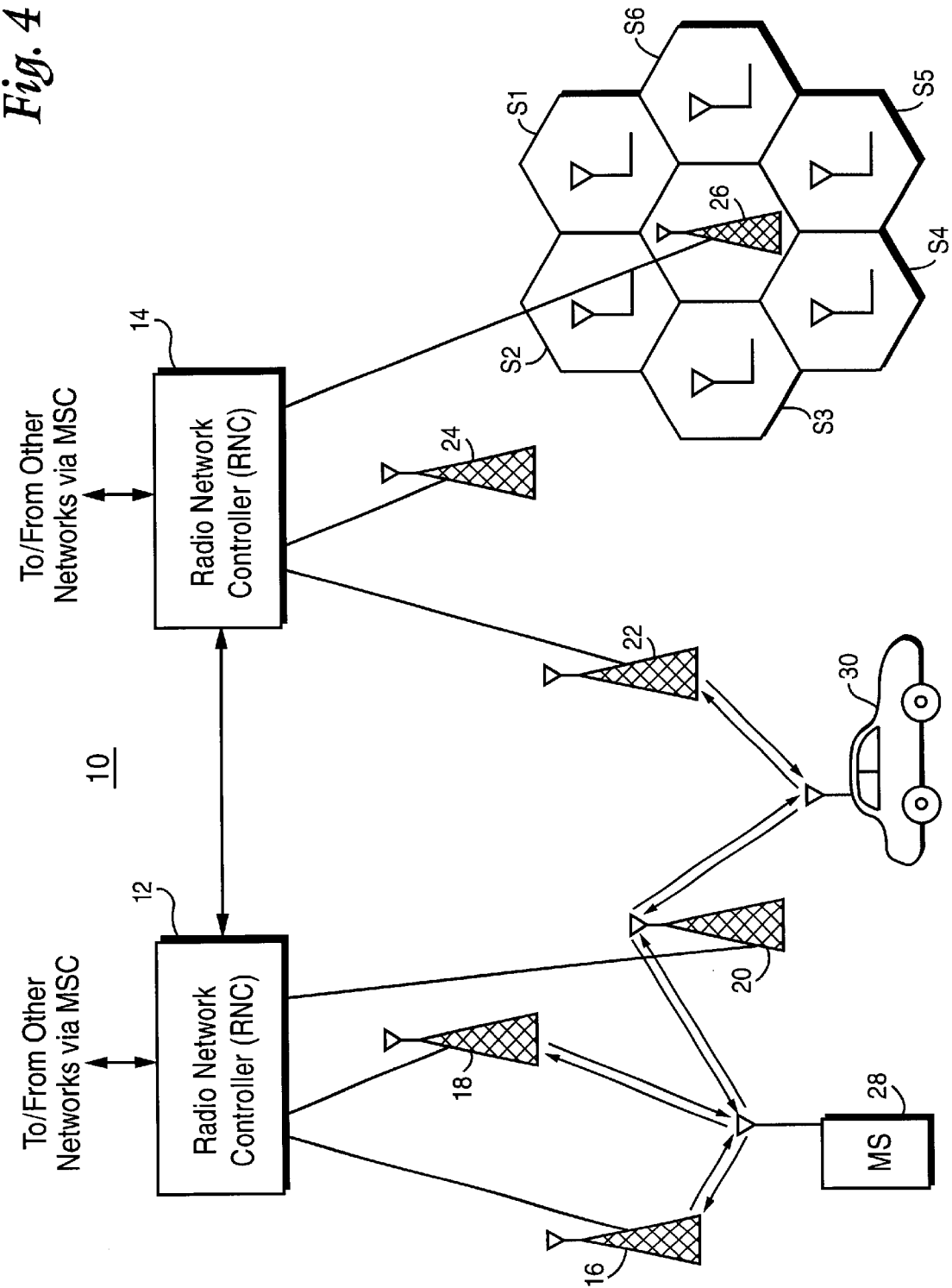
FIG. 4 is a function block diagram of an example radio communications system in which the present invention may be advantageously employed.

While the present invention may be applied to any radio communication and in any direction, e.g., uplink and downlink, the next example embodiment of the present invention is described in the context of uplink communications from one or more mobile stations on a common channel, and in particular, a random access channel. Such common random access channels are employed, for example, in third generation cellular systems based on wideband CDMA. FIG. 4 illustrates a mobile radio cellular communications system 10 which may be a CDMA or a wideband CDMA communications system. Radio network controllers (RNCs) 12 and 14 control various radio network functions including for example radio access bearer setup, diversity handover, etc. Radio network controller 12 is coupled to a plurality of base stations 16, 18, and 20. Radio network controller 14 is connected to base stations 22, 24, and 26. Each base station serves a geographical area referred to as a cell, and a cell may be divided into plural sectors. Base station 26 is shown as having six antenna sectors S1–S6. The base stations are connected to their corresponding radio network controller by various means such as dedicated telephone lines, optical fiber links, microwave links, etc. Both radio network controllers 12 and 14 are connected with external networks such as the Public Switched Telephone Network (PSTN), the Internet, etc. through one or more mobile switching centers and/or a packet radio service node (not shown). The RNC directs mobile station calls via the appropriate base station(s).

In FIG. 4, two mobile stations 28 and 30 are shown communicating with plural base stations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 5:
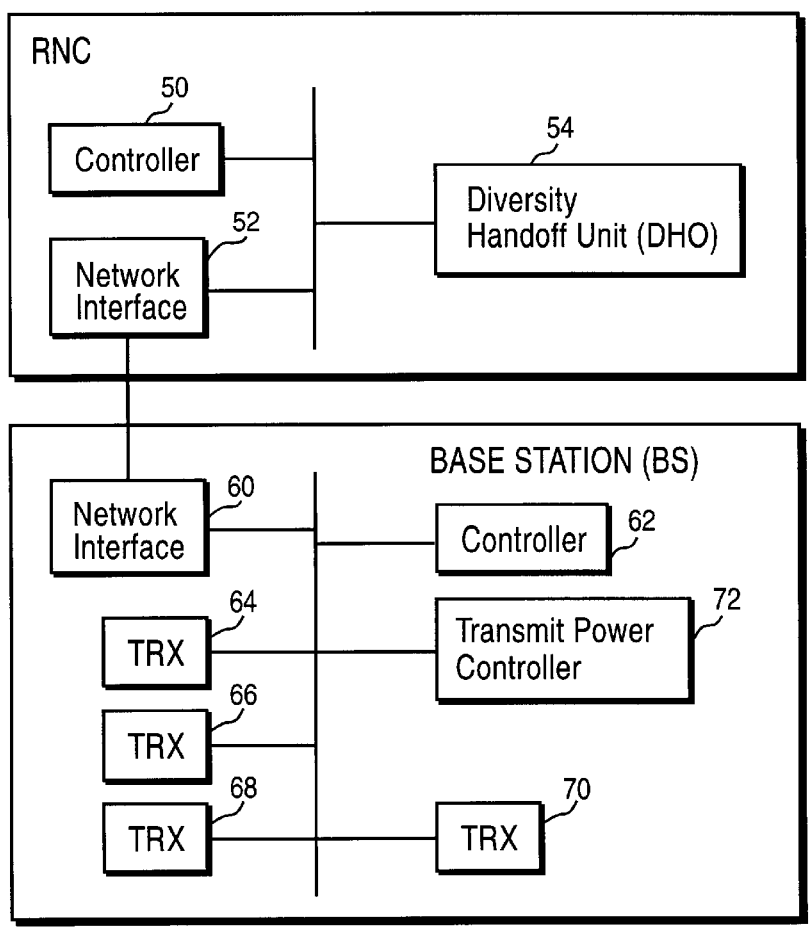
FIG. 5 is a function block diagram showing in more detail a radio network controller and a base station shown in FIG. 4.

Additional details of a base station and a radio network controller are now provided in conjunction with FIG. 5. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs numerous functions required for establishing, maintaining, and dropping diversity connections such as diversity combining, diversity splitting, power control and other link related radio resource control algorithms.

Each base station includes a corresponding network interface 60 for interfacing with the RNC. In addition, the base station includes a controller 62 connected to a plurality of transceivers (TRX) 64, 66, 68, and 70, as well as a transmit power controller 72. Controller 62 controls the overall operation of the base station as well as the establishment, maintenance, and release of radio connections. Representative transceivers 64–70 are individually assigned to specific communications with mobile stations. At least one transceiver is employed as a common control channel over which the base station transmits common signaling such as pilot, synchronization, or other broadcast signaling. Mobile stations within or near that base station's cell monitor the common control channel.

A common channel called the random access channel (RACH) is used by the mobile to transmit (uplink) stations to request a dedicated channel and may also be used for limited amounts of user data. A common forward access channel (FACH) is used by the base station to transmit (downlink) limited amounts of user data. For such common channels like the RACH and the FACH, open loop power control is preferably employed. Transmit power controller 72 performs open loop power control for the downlink, and the transmit power controller performs closed loop power control procedures for the uplink to control the transmit powers from all mobile transmissions received by the base station, e.g., so they are at approximately the same power level assuming all mobiles are using the same type of service.

Figure 6:
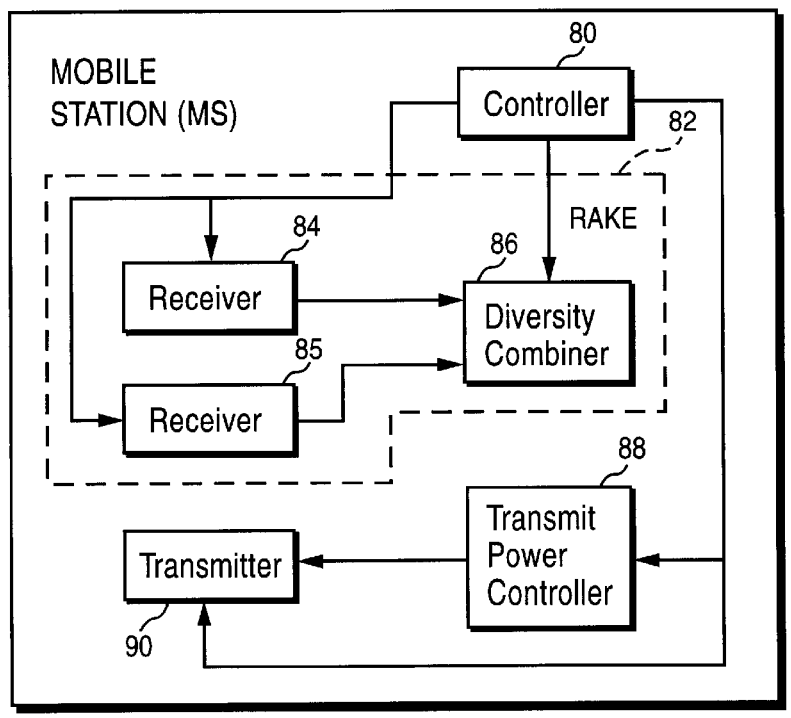
FIG. 6 is a function block diagram illustrating in more detail a mobile station shown in FIG. 4.

FIG. 6 illustrates additional details of a mobile station shown in FIG. 4. The mobile station includes a controller 80 connected to a RAKE receiver 82, a transmit power controller 88, and a transmitter 90. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combining diversity combiner 86 and processed as one signal. Transmit power controller 88 determines the power level (preferably as a carrier-to-interference ratio (CIR) or as a signal-to-interference ration ($E_b/I_o$)) of the received, diversity-combined signal.

Figure 7:
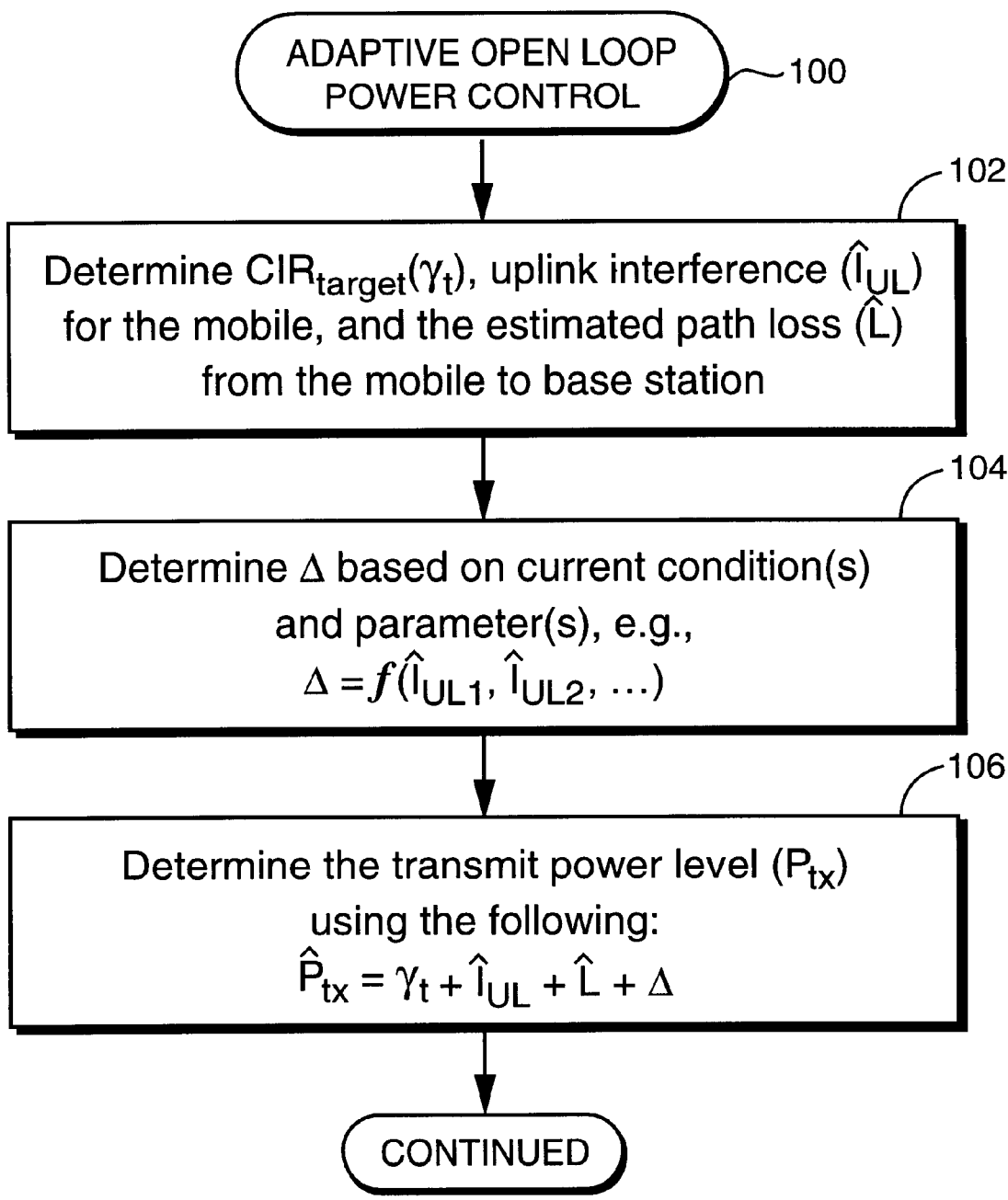
FIG. 7 is an adaptive open loop power control routine in accordance with another example embodiment of the present invention.

The operation of this example embodiment of the present invention is now described in conjunction with an adaptive open loop power control routine (block 100) shown in FIG. 7 in flowchart format. The mobile station 30 detects a target carrier-to-interference ratio $\gamma_t$ broadcast from a base station over a downlink access channel. The target CIR $\gamma_t$ may also be predefined in the system, and hence, already known by the mobile station. The mobile station 30 also detects the current uplink interference estimate $\hat{I}_{UL}$ measured and broadcast by the base station over its corresponding geographic cell together with a downlink pilot (or other broadcast) signal transmit power value. The mobile controller 80 then determines an estimate of the path loss $\hat{L}$ by taking the difference between the broadcast value of the transmit power at which the downlink pilot signal was actually transmitted from the base station (block 102) and the actual received power of the downlink pilot signal. From these determined parameters $\gamma_t$, $\hat{I}_{UL}$, and $\hat{L}$, an open loop transmission power level $\hat{P}_{tx}$ may be determined by the mobile controller 80 in accordance with equation (1) above, i.e., $\hat{P}_{tx} = \gamma_t + \hat{I}_{UL} + \hat{L}$.

However, the mobile station 30, e.g., the mobile station controller 80, also determines an cell specific adaptive power parameter, referred to in this example embodiment as a power offset value Δ, based on current conditions and parameters (block 104). The mobile's transmit power is then determined (block 106) in accordance with the following:

$$\hat{P}_{tx} = \gamma_t + \hat{I}_{UL} + \hat{L} + \Delta \qquad (3)$$

This power offset Δ preferably is a cell specific offset $\Delta_C$ that depends on the current traffic load in the cell. For example, $\Delta_C$ may be a function of the measured uplink interference $\hat{I}_{UL}$ in the cell where the mobile station performs a random access, as well as the uplink interference in one or more neighboring cells. Thus, the power offset $\Delta_C$ may be defined (block 104) as a function of plural measured uplink interference values in the current and surrounding cells as follows:

$$\Delta_C = f(\hat{I}_{UL}, \hat{I}_{UL1}, \hat{I}_{UL2}, \ldots, \hat{I}_{ULN}) \qquad (4)$$

The uplink interference $\hat{I}_{UL}$ is measured in the cell where the mobile station performs the random access, and $\hat{I}_{UL1}$, $\hat{I}_{UL2} \ldots, \hat{I}_{ULN}$ are measured uplink interference values in N surrounding cells. Therefore, while only the local uplink interference value $\hat{I}_{UL}$ may be employed, several uplink interference values from the surrounding cells are preferably used.

This is because in a CDMA system all mobile stations transmit and receive on the same frequency and therefore create uplink interference in surrounding cells as well. As a result, the interference levels in these cells typically affect the overall impact of uplink interference on the mobile.

One simple example function for equation (4) is $\Delta_C = A (I_{ULmax} - \hat{I}_{UL})$, where A is a constant and $I_{ULmax}$ is the maximum allowed uplink interference. Of course, other functions may be used. In general, the lower the interference value(s), the larger $\Delta_C$ may be. Preferably, the interference in the mobile's current cell should also have a larger effect on $\Delta_C$ than the interference values for neighboring cells.

A random access always creates more uplink interference. The other, already-active mobiles therefore need to increase their respective transmit powers to maintain the same target CIR thereby increasing the uplink interference even more. But at low traffic loads, i.e., low $I_{UL}$, the system can allow this to occur because the $I_{UL}$ will not increase above a maximum allowed value which defines the maximum uplink capacity of the CDMA system. Moreover, the interference created by the random access may be compensated for in other active mobiles in the cell using closed loop power control.

Hence, for low traffic loads, the parameter $\Delta_C$ is set higher resulting in a higher transmission power. As illustrated above in FIG. 3, this moves the probability density function of the carrier-to-interference ratio to the right of the target CIR resulting in a larger probability of successful random access and a lower packet delay. Low traffic load cases will predictably be quite common since the cellular system will probably be dimensioned for higher traffic load cases which typically occur only during certain busy times. So this higher transmission power will result in improved system performance for the typical traffic scenario. Conversely, at higher traffic loads, when the uplink interference is close to a maximum allowed value, the power offset $\Delta_C$ is set lower, perhaps even to a negative value as illustrated in FIG. 3 to avoid excessive disturbance for other users on the uplink. Although this gives a smaller probability of receipt at the target CIR, and therefore, a lower probability of a successful random access and a longer packet delay, this tradeoff is necessary during high interference periods to ensure continued communications without escalating transmit powers (i.e., the party effect) to the detriment of all users.

The above description explains how the power offset $\Delta_C$ in accordance with one example of the present invention may be applied in the setting of mobile transmit power for an uplink common channel, (e.g., a RACH channel). In addition, the power offset $\Delta_C$ may be applied for downlink common channels with open loop power control, (e.g., a FACH channel). In downlink common channels, the path loss and the interference at the mobile station is measured and reported by the mobile to the radio network. Alternatively, the mobile station informs the network of how much more or less the base station transmit power level on FACH should be compared to the broadcast pilot signal transmit power level. After having calculated the FACH transmit power level, the radio network may then apply the power offset $\Delta_C$ to that transmit power level and adapt it to high or low traffic load conditions as described above for uplink transmissions.

The mobile's transmit power at random access may also depend on user specific parameters either alone or in addition to uplink interference. For example, the power offset may depend on the particular data packet mode to be employed by the mobile station after the random access. For example, if the mobile station will be allocated a dedicated traffic channel immediately after the random access, the power offset maybe set to a higher value to provide a quick random access and thereby facilitate a rapid transfer to a dedicated channel. Dedicated traffic channels have higher capacity and generally employ more precise closed loop power control which creates less interference to the system overall compared to shared or common traffic channels that typically do not employ closed loop power control. In addition, the power offset may depend on a mobile user's subscription. Mobile users may subscribe to a priority access feature resulting in a larger power offset to increase their chances of fast random access and lower delays on common channels. Hence, a user specific power offset $\Delta_U$ could also be added to set the mobile transmit power in the same way as the cell specific power offset $\Delta_C$ described above, i.e., $$\hat{P}_{tx} = \gamma_t + \hat{I}_{UL} + \hat{L} + \Delta_C + \Delta_U \tag{5}$$

The power offset $\Delta_U$ may also be used without $\Delta_C$ and in setting of the transmit power level on a downlink common channel, e.g., the FACH channel.

The mobile's transmit power at random access may depend still on other factors. As described in the background, part of the error between the received carrier-to-interference ratio (CIR) and the target CIR ($\gamma_t$) is due to the inability of the mobile station to actually transmit at the calculated transmit power $\hat{P}_{tx}$. Instead, the mobile may transmit at an actual power $P_{tx}$ that may differ considerably from the calculated or otherwise desired power $\hat{P}_{tx}$. The following example variables may have a significant impact on the actual transmission power level despite the transmit power controller 88 providing a desired transmit power level to the transmitter 90:

- mobile station temperature
- actual power level at which the mobile station is currently transmitting
- individual electronic components contained in the specific mobile.

Another significant factor is that the mobile station may also have a systematic error in estimating the path loss. The estimated path loss $\hat{L}$ will likely differ from the real path loss L due to inaccurate measurements of a signal strength detector in the mobile station. The path loss estimate will likely also differ from the actual path loss due to fading, noise, and delays in measuring the path loss. Furthermore, the actual transmit power at which the base station actually transmits a pilot signal likely differs from the broadcasted downlink pilot signal output power value used by the mobile station for the path loss estimate. These factors are referred to as mobile station specific errors and as base station specific errors, respectively.

Such mobile and base station specific errors may be compensated in the present invention using an equipment-specific power offset $\Delta_E$. Knowledge of the mobile station specific parameters may be accumulated and stored in the mobile station. Knowledge of base station specific errors may be accumulated and stored for each base station in the mobile station. The mobile station then applies the appropriate compensation.

In the example that follows, it is assumed that the base station measures the received power level accurately and that the broadcast power level for the base station pilot signal is equal to the actual transmitted power level of the pilot. The example illustrates the mobile station compensating for temperature drift, systematic errors in signal strength detection, and systematic differences between the actual transmitted output power and the assigned output power. Other factors that result in transmit power errors maybe compensated for in a similar way.

During a random access transmission, the base station measures the received random access signal power C from the mobile station, $C=P_{tx}-L$, and provides the measured value $\hat{C}$ back to the mobile station. The mobile aims at achieving a target received random access signal power $C_t$ equal to $C_t=\hat{P}_{tx}-\hat{L}$. From this, the mobile station determines a received signal power error E of $$E = C_t - \hat{C} \quad (6)$$

If E is positive, the mobile transmitted power was too low; and if E is negative, the mobile used more power than needed to achieve the received power target $C_t$. The mobile station measures and stores its current temperature, the current transmit power level, and the signal power error E in a look-up table for this particular temperature and power level. The next time the mobile station performs a random access transmission, the mobile looks up in the table the stored signal power error for the actual temperature and transmit power level and tries to compensate for such error. There are a number of ways to implement this compensation. One way is to define an equipment-specific compensation term $\Delta_E$ at time t as follows:

$$\Delta_E(t) = \alpha \cdot E(t-1) + (1-\alpha) \cdot E(t-2) = \alpha \cdot [C_t(t-1) - \hat{C}(t-1)] + (1-\alpha) \cdot [C_t(t-2) - \hat{C}(t-2)] \quad (7)$$

where E(t−1) denotes a previously received signal power error value for this temperature and transmit power and E(t−2) is the second previous value. The coefficient α (<1) denotes the degree to which $\Delta_E$ is updated according to new data.

Thus, for a given temperature and absolute power level, the mobile station calculates the compensation term $\Delta_E$ and adds it to the mobile transmit power in the same way as the cell specific and user specific offsets $\Delta_C$ and $\Delta_U$ in equation (5) above, using all, some, or just one of the specific power offsets, e.g., $$\hat{P}_{level} = \gamma_t + \hat{I}_{UI} \hat{L} + \Delta_C + \Delta_U + \Delta_E \quad (8)$$

One or more specific power offsets $\Delta_E$ values are calculated by the mobile station controller 80. For uplink common channel transmissions, $\Delta_C$ and $\Delta_U$, is preferably calculated in the RNC and broadcast to the mobiles. For downlink common channels transmissions, all power offsets are preferably calculated in the RNC. It may be preferable to have the RNC controller 50 calculate power offsets for each cell, to allow for centralized handling and broadcasting.

While the present invention has been described with respect to particular example embodiments, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. For example, the present invention is applicable to both uplink and downlink channels. Moreover, the invention may be used in conjunction with other applications such as power ramping. In the power ramping situation, the present invention may be employed to advantageously decide at which transmit power from which to start ramping.

What is claimed is:

1. In a mobile communications system having plural base stations corresponding to coverage cells and plural mobile stations, a method for improving communications between a mobile station and a base station over a radio communications channel, comprising:
    establishing a predetermined relationship between a desired communications signal and an interference signal;
    determining at the base station an uplink interference value corresponding to interference in one of the cells;
    determining a signal loss factor associated with a radio path in the cell;
    determining a power parameter using the uplink interference; and
    calculating a transmission power at which to transmit over the radio communications channel based on the predetermined relationship, the uplink interference value, the signal loss factor, and the power parameter.

2. The method in claim 1, wherein the power parameter is an adaptive power offset.

3. The method in claim 1, wherein the power parameter is a function of interference in the one cell and at least one neighboring cell.

4. The method in claim 1, further comprising:
    wherein the radio communications channel is an uplink channel, and wherein the power parameter is larger for lower uplink interference and smaller for greater uplink interference.

5. The method in claim 1, wherein the radio communications channel is an access channel.

6. The method in claim 5, wherein the access channel is an uplink random access channel (RACH) from the mobile station to a base station in the cell.

7. The method in claim 5, wherein the access channel is a downlink forward access channel (FACH) from the base station to the mobile station.

8. The method in claim 1, wherein the predetermined relationship is a carrier-to-interference ratio determined at a base station.

9. The method in claim 1, wherein the path loss factor is the path loss factor determined on a channel between the mobile station and a base station in the cell.

10. The method in claim 1, further comprising:
    detecting a current temperature of the mobile station;
    determining an equipment parameter based on one or more equipment related factors including the detected temperature of the mobile station; and
    calculating the transmission power based on the predetermined relationship, the interference value, the signal loss factor, the power parameter, and the equipment parameter.

11. The method in claim 10, wherein the one or more equipment related factors includes an error in the determined path loss factor or in the determined cell interference.

12. The method in claim 10, wherein the one or more equipment related factors includes a transmit power level error.

13. The method in claim 10, wherein the one or more equipment related factors includes a compensation value for equipment-related inaccuracies and physical limitations.

14. The method in claim 1, wherein determining the power parameter further includes determining plural power parameters, and wherein the transmission power is calculated based on the predetermined relationship, the interference value, the signal loss factor, and the plural power parameters.

15. The method in claim 14, wherein the plural power parameters include two or more of a cell-specific power parameter, a user-specific power parameter, and an equipment-specific power parameter.

16. The method in claim 15, wherein the cell-specific power parameter is based on a cell traffic load, the user-specific power parameter is determined based on a user packet data mode, and the equipment-specific power parameter is determined based on an equipment error.

17. The method in claim 14, wherein delay on a common radio communications channel employed by plural mobile stations to communicate with the base station located in a corresponding geographical cell area is reduced by adapting transmission power based on the traffic load in the cell area.

18. The method in claim 17, further comprising:
for lower traffic loads, setting a higher power for transmission over the common radio channel.

19. The method in claim 17, further comprising:
for higher traffic loads, setting a lower power for transmission over the common radio channel.

20. The method in claim 14, wherein the method in claim 14 is used in an open loop power control procedure to control transmission power on the radio communications channel.

21. The method in claim 20, wherein the radio communications channel is an uplink access channel.

22. The method in claim 20, wherein the radio communications channel is a downlink access channel.

23. In a mobile communications system having plural base stations corresponding to coverage cells and plural mobile stations, a method for improving communications between a mobile station and a base station over a radio communications channel, comprising:
establishing a predetermined relationship between a desired communications signal and an interference signal;
determining an interference value corresponding to interference in one of the cells;
determining a signal loss factor associated with a radio path in the cell;
determining a power parameter using a traffic load in the one cell; and
calculating a transmission power at which to transmit over the radio communications channel based on the predetermined relationship, the interference value, the signal loss factor, and the power parameter;
wherein for lower traffic loads, the power parameter increases the transmission power for transmissions over the communications channel, and for higher traffic loads, the power parameter decreases the transmission power for transmissions over the communications channel.

24. In a mobile communications system having plural base stations corresponding to coverage cells and plural mobile stations, a method for improving communications between a mobile station and a base station over a radio communications channel, comprising:
establishing a predetermined relationship between a desired communications signal and an interference signal;
determining an interference value corresponding to interference in one of the cells;
determining a signal loss factor associated with a radio path in the cell;
determining a power parameter based on one or more mobile user specific factors including whether a type of radio channel that will be employed between the mobile station and the base station is a dedicated channel dedicated to the mobile station or a common channel shared by plural mobile stations; and
calculating a transmission power at which to transmit over the radio communications channel based on the predetermined relationship, the interference value, the signal loss factor, and the power parameter.

25. The method in claim 24, wherein the power parameter is larger when the type of radio channel includes a dedicated connection dedicated to the mobile station and the power parameter is lower when the type of radio channel includes a common connection shared by plural mobile stations.

26. The method in claim 24, wherein the one or more user specific parameters include a subscription associated with the mobile station.

27. In a mobile communications system having plural base stations corresponding to coverage cells in plural mobile stations, an open loop power control method for communications between a mobile station and a base station over a radio communications channel, comprising:
establishing a signal-to-interference ratio;
determining an interference value corresponding to the interference in one of the cells;
determining a signal loss factor associated with a radio path in the cell;
determining an additional adaptive power parameter using uplink interference in the cell and a neighboring cell; and
controlling transmission power on the radio communications channel based upon the signal-to-interference ratio, the interference value, the signal loss factor, and the additional adaptive power parameter.

28. The method in claim 27, wherein the adaptive power parameter is a function of one or more specific characteristics of one or more mobile stations active in the cell.

29. The method in claim 27, wherein the adaptive power parameter is a function of traffic load in the cell.

30. The method in claim 27, wherein the adaptive power parameter is a function of user specific factors.

31. The method in claim 27, wherein the adaptive power parameter is a function of equipment-related factors.

32. For use in a mobile communications system having plural base stations corresponding to coverage cells and plural mobile stations, a radio node for facilitating communications between a mobile station and a base station over a radio communications channel, comprising electronic circuitry configured to perform the following tasks:
establish a predetermined relationship between a desired communications signal and an interference signal;
determine an uplink interference value corresponding to interference in one of the cells;
determine a signal loss factor associated with a radio path in the cell;
determine a power parameter using the uplink interference; and
calculate a transmission power at which to transmit over the radio communications channel based on the predetermined relationship, the uplink interference value, the signal loss factor, and the power parameter.

33. The radio node in claim 32, wherein the power parameter is a function of interference in the one cell and at least one neighboring cell.

34. For use in a mobile communications system having plural base stations corresponding to coverage cells and plural mobile stations, a radio node for facilitating communications between a mobile station and a base station over a radio communications channel, comprising electronic circuitry configured to perform the following tasks:

establish a predetermined relationship between a desired communications signal and an interference signal;

determine an interference value corresponding to interference in one of the cells;

determine a signal loss factor associated with a radio path in the cell;

determine a power parameter based on one or more mobile user specific factors including whether a type of radio channel that will be employed between the mobile station and the base station is a dedicated channel dedicated to the mobile station or a common channel shared by plural mobile stations; and calculate a transmission power at which to transmit over the radio communications channel based on the predetermined relationship, the interference value, the signal loss factor, and the power parameter.

35. The radio node in claim 34, wherein the power parameter is larger when the type of radio channel includes a dedicated connection dedicated to the mobile station and the power parameter is lower when the type of radio channel includes a common connection shared by plural mobile stations.

36. The radio node in claim 34, further comprising:

means for detecting a current temperature of the mobile station;

means for determining an equipment parameter based on one or more equipment related factors including the detected temperature of the mobile station; and wherein the electronic circuitry is configured to calculate the transmission power based on the predetermined relationship, the interference value, the signal loss factor, the power parameter, and the equipment parameter.

37. The radio node in claim 36, wherein the one or more equipment related factors includes an error in the determined path loss factor or in the determined cell interference.

38. The radio node in claim 36, wherein the one or more equipment related factors includes a transmit power level error.

39. The radio node in claim 36, wherein the one or more equipment related factors includes a compensation value for equipment-related inaccuracies and physical limitations.

40. For use in a mobile communications system having plural base stations corresponding to coverage cells and plural mobile stations, an open loop power controller for communications between a mobile station and a base station over a radio communications channel, comprising electronic circuitry configured to perform the following tasks:

establish a signal-to-interference ratio;

determine an interference value corresponding to the interference in one of the cells;

determine a signal loss factor associated with a radio path in the cell;

determine an adaptive power parameter using uplink interference in the cell and a neighboring cell; and control transmission power on the radio communications channel based upon the signal-to-interference ratio, the interference value, the signal loss factor, and the adaptive power parameter.

* * * * *